United States Patent
Mucciarone et al.

(10) Patent No.: US 12,107,861 B2
(45) Date of Patent: Oct. 1, 2024

(54) SYSTEMS AND METHODS FOR MANAGING IDS IN IAM/RESOURCE POLICIES

(71) Applicant: CAPITAL ONE SERVICES, LLC, McLean, VA (US)

(72) Inventors: Michael Mucciarone, Frisco, TX (US); Lawrence Dolinar, Richardson, TX (US)

(73) Assignee: Capital One Services, LLC, McLean, VA (US)

( * ) Notice: Subject to any disclaimer, the term of this patent is extended or adjusted under 35 U.S.C. 154(b) by 460 days.

(21) Appl. No.: 17/398,999

(22) Filed: Aug. 10, 2021

(65) Prior Publication Data

US 2023/0052411 A1  Feb. 16, 2023

(51) Int. Cl.
*H04L 9/40* (2022.01)

(52) U.S. Cl.
CPC ............ *H04L 63/102* (2013.01); *H04L 63/20* (2013.01)

(58) Field of Classification Search
CPC .............................. H04L 63/102; H04L 63/20
See application file for complete search history.

(56) References Cited

U.S. PATENT DOCUMENTS

| | | | |
|---|---|---|---|
| 7,257,590 B2 * | 8/2007 | Heiner ...................... | H04L 9/40 |
| 7,554,980 B1 * | 6/2009 | Yeh ......................... | H04L 45/54 |
| | | | 707/999.001 |
| 7,907,970 B2 | 3/2011 | Park et al. | |
| 9,008,316 B2 * | 4/2015 | Acar ..................... | H04L 9/0819 |
| | | | 380/278 |
| 9,124,430 B2 * | 9/2015 | Harjula ................... | H04L 63/20 |
| 9,369,279 B2 * | 6/2016 | Harjula ................. | H04L 9/0894 |
| 9,515,999 B2 * | 12/2016 | Ylonen ................. | H04L 63/101 |
| 9,805,041 B2 * | 10/2017 | Purtell, II ............. | G06F 16/122 |
| 9,832,177 B2 * | 11/2017 | Ylonen ................... | H04L 67/01 |
| 9,998,497 B2 * | 6/2018 | Ylonen ................. | H04L 9/0891 |
| 10,116,700 B2 * | 10/2018 | Ylonen ................... | H04L 63/08 |
| 10,171,508 B2 * | 1/2019 | Ylonen ............... | H04L 61/4523 |
| 10,187,426 B2 * | 1/2019 | Ylonen ................. | H04L 63/062 |
| 10,277,632 B2 * | 4/2019 | Ylonen ................. | H04L 9/3263 |
| 10,530,814 B2 * | 1/2020 | Ylonen ................. | H04L 63/061 |
| 10,606,800 B1 * | 3/2020 | Purtell, II ............. | G06F 16/122 |
| 10,693,916 B2 * | 6/2020 | Ylonen ................. | H04L 63/065 |
| 10,708,307 B2 * | 7/2020 | Ylonen ............... | H04L 63/0428 |
| 10,721,238 B2 | 7/2020 | Roth et al. | |
| 10,812,530 B2 * | 10/2020 | Ylonen ................. | H04L 63/065 |
| 2004/0243563 A1 * | 12/2004 | Heiner ...................... | H04L 9/40 |
| 2009/0092252 A1 * | 4/2009 | Noll ....................... | H04L 9/083 |
| | | | 380/277 |

(Continued)

*Primary Examiner* — Sharon S Lynch
(74) *Attorney, Agent, or Firm* — Bookoff McAndrews, PLLC

(57) ABSTRACT

Disclosed are methods, systems, and non-transitory computer-readable medium for managing IDs in identity access management (IAM)/resource policies. For instance, the method may include obtaining a request regarding a target identification in a set of IAM/resource policies, the request including an action request; pulling the set of IAM/resource policies from a service; for each policy of the set of IAM/resource policies, traversing a data structure of the policy to return keypath(s) that include the target identification; and modifying each policy that includes the target identification by performing the action request using the keypath(s).

20 Claims, 5 Drawing Sheets

(56) References Cited

U.S. PATENT DOCUMENTS

| | | | | |
|---|---|---|---|---|
| 2010/0281083 A1* | 11/2010 | Purtell, II | ............. | G06F 16/122 |
| | | | | 711/112 |
| 2013/0259234 A1* | 10/2013 | Acar | ....................... | H04L 9/088 |
| | | | | 380/278 |
| 2015/0086009 A1* | 3/2015 | Harjula | ................. | H04L 9/0891 |
| | | | | 380/44 |
| 2015/0086020 A1* | 3/2015 | Harjula | ................. | H04L 63/062 |
| | | | | 380/279 |
| 2015/0222604 A1* | 8/2015 | Ylonen | ................. | H04L 9/3263 |
| | | | | 713/171 |
| 2017/0012953 A1* | 1/2017 | Ylonen | ............... | H04L 63/0428 |
| 2017/0019386 A1* | 1/2017 | Ylonen | ................. | H04L 9/0891 |
| 2017/0019387 A1* | 1/2017 | Ylonen | ............... | H04L 63/0435 |
| 2017/0041349 A1* | 2/2017 | Ylonen | ................... | H04L 9/321 |
| 2017/0163689 A1* | 6/2017 | Ylonen | ................. | H04L 63/065 |
| 2017/0171175 A1* | 6/2017 | Ylonen | ................. | H04L 63/101 |
| 2017/0222995 A1* | 8/2017 | Ylonen | ................... | H04L 9/321 |
| 2017/0366580 A1* | 12/2017 | Ylonen | ................. | H04L 63/065 |
| 2017/0366581 A1* | 12/2017 | Ylonen | ................. | G06F 21/575 |
| 2018/0232262 A1* | 8/2018 | Chowdhury | ............ | G06F 9/541 |
| 2019/0075134 A1* | 3/2019 | Ylonen | ............... | H04L 63/0442 |
| 2020/0005290 A1* | 1/2020 | Madisetti | ................. | H04L 9/50 |

* cited by examiner

200

POLICY 1

```
{
    "Version": "1.1.1",                    ~210
    "Statement": [
        {
            "Sid": "SID1",                 ~225
            "Effect": "Allow",             ~230
            "Action": [
                "ACTION1",
                "ACTION2"                  ~235
            ],
            "Resource": [
                "ARN1",
                "ARN2"                     ~240
            ]
        },
        {
            "Sid": "SID2",                 ~225
            "Effect": "Deny",              ~230
            "Action": [
                "ACTION3",
                "ACTION4",
                "ACTION5"                  ~235
            ],
            "Resource": [
                "ARN3",
                "ARN4",
                "ARN5"                     ~240
            ]
        }
    ]
}
```

*FIG. 2*

SYSTEMS AND METHODS FOR MANAGING IDS IN IAM/RESOURCE POLICIES

TECHNICAL FIELD

Various embodiments of the present disclosure relate generally to systems and methods for managing IDs in identity access management (IAM)/resource policies and, more particularly, to systems and methods for managing IDs in IAM/resource policies using automated search, action, and confirm functions to update IDs.

BACKGROUND

Policies of identity access management (IAM) systems control which entities (e.g., users, roles, machines) may access and use another machine or resource. However, when a cloud environment includes numerous resources, machines, users, and roles, a number of policies to ensure security and proper authorization becomes difficult to manage. For instance, the process to update numerous policies when a security policy changes may be slow and inaccurate. Therefore, a first challenge for IAM systems may be how to provide faster, more accurate changes to policies of IAM systems.

Additionally, when a security compromise occurs, IAM systems may be vulnerable to cyber-attack. Therefore, a second challenge for IAM systems may be how to regain security after a security compromise occurs.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for managing IDs in IAM/resource policies.

For instance, a method may include obtaining a request regarding a target identification in a set of IAM/resource policies, the request including an action request; pulling the set of IAM/resource policies from a service; for each policy of the set of IAM/resource policies, traversing a data structure of the policy to return keypath(s) that include the target identification; and modifying each policy that includes the target identification by performing the action request using the keypath(s).

A system may include at least one memory storing instructions; and at least one processor executing the instructions to perform a process. The process may include obtaining a request regarding a target identification in a set of IAM/resource policies, the request including an action request; pulling the set of IAM/resource policies from a service; for each policy of the set of IAM/resource policies, traversing a data structure of the policy to return keypath(s) that include the target identification; and modifying each policy that includes the target identification by performing the action request using the keypath(s).

A non-transitory computer-readable medium may store instructions that, when executed by a processor, cause the processor to perform a method. The method may include: obtaining a request regarding a target identification in a set of IAM/resource policies, the request including an action request; pulling the set of IAM/resource policies from a service; for each policy of the set of IAM/resource policies, traversing a data structure of the policy to return keypath(s) that include the target identification; and modifying each policy that includes the target identification by performing the action request using the keypath(s), the action request being selected from a group comprising: a delete action, an add action, a modify action, and a report action.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts an exemplary policy to be managed, according to one or more embodiments.

DETAILED DESCRIPTION OF EMBODIMENTS

Figure 1:
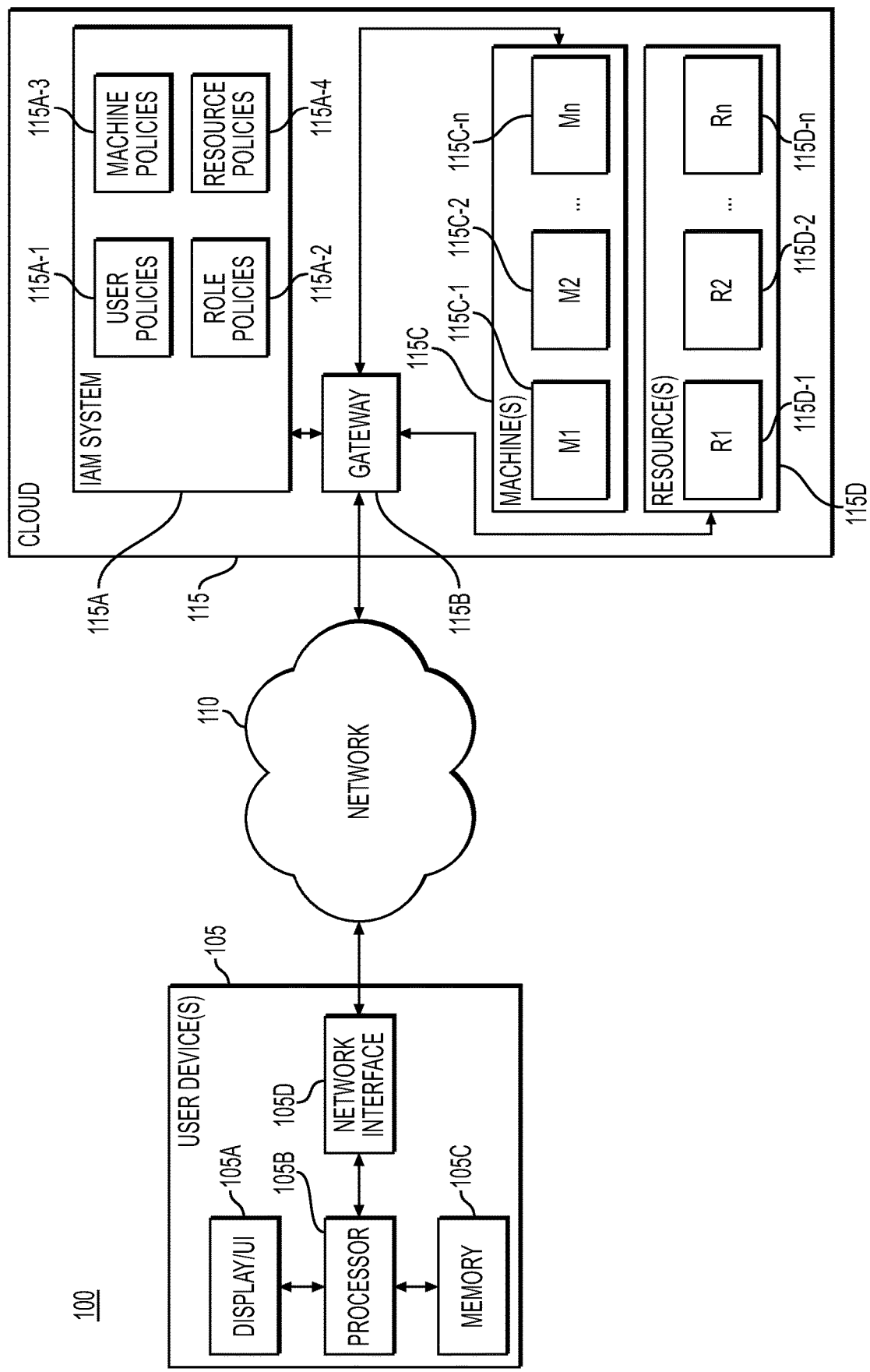
FIG. 1 depicts an exemplary block diagram of a system for managing IDs in IAM/resource policies, according to one or more embodiments.

Various embodiments of the present disclosure relate generally to systems and methods for managing IDs in IAM/resource policies.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to systems and methods for managing IDs in IAM/resource policies using automated search, action, and confirm functions to update IDs. For instance, systems and methods of the present disclosure may find all instances of a given ID in a set of IAM policies (e.g., resource policies) for a cloud environment, and generate a data set indicating statement IDs (SID) and/or keypaths for the given ID. Systems and methods of the present disclosure may then automatically perform an action for the given ID, such as delete it, add a new ID in a same location as the given ID, or modify the given ID to a new ID. Therefore, systems and methods of the present disclosure may enable easy and automated auditing of given IDs across IAM policies, e.g., to manage the IAM system and secure the cloud environment, thereby increasing accuracy and/or security. Moreover, systems and methods of the present disclosure may execute a confirmation check to ensure that the change (e.g., delete, add, modify, etc.) was successfully completed for all of the policies, thereby increasing accuracy and/or security in case of error or system crash before the process was completed. Systems and methods of the present disclosure may facilitate a deployment of updated policies so as to save user time and effort, increase accuracy, and/or reduce security vulnerabilities.

In an exemplary embodiment, at least one embodiment has been implemented as a tool that can scan all bucket policies in a cloud environment for a given IAM ID and generate a report allowing for a quick update of all bucket policies where the IAM ID was found.

As shown in FIG. 1, FIG. 1 depicts an exemplary block diagram of a system 100 for systems and methods for managing IDs in IAM/resource policies, according to one or more embodiments. The system 100 may include user device(s) 105 (hereinafter "user device 105" for ease of reference), network 110, and cloud 115. The system 100 may manage IDs in IAM/resource policies in an identity access management (IAM) system 115A, discussed below. In particular, the system 100 may add, delete, or modify existing IDs in policies, in accordance with embodiments of the disclosure. Generally, the system 100 may manage the IDs as users, roles, resources, or machines change. An exemplary change that may occur for a user, role, resource, or machine (generally, "entities") include whether the entities require/do not require access/permission/authorization, etc. to other resources or machines, in accordance with policies indicating the entities may or may not access and perform certain actions. In certain embodiments, the system 100 may delete or modify existing IDs, e.g., so as to increase security of the cloud 115, responsive to the cloud 115 and/user device 105 indicating a particular ID is/has been compromised.

The user device 105 and the cloud 115 may be connected via the network 110, using one or more standard communication protocols. The network 110 may be one or a combination of the Internet, a local network, a private network, or other network. The user device 105 and the cloud 115 may transmit and receive messages from each other across the network 110, as discussed in more detail below.

The user device 105 may include a display/UI 105A, a processor 105B, a memory 105C, and/or a network interface 105D. The user device 105 may be a computer or a mobile device, such as a cell phone, a tablet, etc. The user device 105 may execute, by the processor 105B, an operating system (OS) and an application. The application may coordinate with the cloud 115 to manage the IAM system 115A, discussed below, by API calls and/or user interfaces. One of skill in the art would recognize that such management might be done by various API calls/requests to request data and/or to add, delete, or modify settings/data of the IAM system 115A. Likewise, a website or application-based interface may enable users to change settings using user inputs. Moreover, in certain embodiments, the cloud 115 and/or the user device 105 may automatically send instructions to add, delete, or modify target identifications (IDs) for security purposes. The display/UI 105A may be a touch screen or a display with other input systems (e.g., buttons, keyboard, etc.) to display the GUIs. The network interface 105D may be a TCP/IP network interface for, e.g., Ethernet or wireless communications with the network 110. The processor 105B, while executing the application, may receive commands and/or user inputs from the display/UI 105A, and perform actions or functions in accordance with the application.

The cloud 115 may be a software as a service, storage as a service, or managed server system (generally, "a service"). The cloud 115 may include the IAM system 115A, a gateway 115B, machine(s) 115C, and/or resource(s) 115D. The cloud 115 may host the machine(s) 115C, and/or the resource(s) 115D to provide cloud functions, cloud applications, data storage, websites, etc. Generally, the cloud 115 may be used to provide computing and/or data storage, e.g., in accordance with design choices of users of user device(s) 105. The cloud 115 may use the IAM system 115A and the gateway 115B to control access to and permission to (1) use particular machines of the machines 115C and (2) use particular resources of the resource(s) 115D, for particular users (see user policies 115A-1), particular roles (see role policies 115A-2), and/or particular machines (see machine policies 115A-3), in accordance with the policies in user policies 115A-1, role policies 115A-2, machine policies 115A-3, and/or resource policies 115A-4.

In particular, the gateway 115B may manage requests and responses between user devices 105, machine(s) 115C, and/or resource(s) 115D, in accordance with instructions from the IAM system 115A. For instance, in one example, the gateway 115B may have copies of policies hosted by the IAM system 115A (updated periodically or instantly when changes are made in the IAM system 115A), or, in another example, the gateway 115B may request an indication from the IAM system 115A whether a particular user, role, or machine is allowed to access a particular machine or resource. One of skill in the art would recognize that the IAM system 115A and the gateway 115B might coordinate the approval in several different ways (e.g., using second factor authentication, sessions, passwords, etc.) without departing from the embodiments of the disclosure.

The machine(s) 115C may include one or a plurality of machines, such as machine 115C-1, machine 115C-2, . . . and machine 115C-n. The machine(s) 115C may be lambda functions, EC2 instances, etc. Generally, the machine(s) 115C may be a hosted software function, micro-service, or application on the cloud 115. Each of the machine(s) 115C may be associated with a unique ID. The IAM system 115A may use the unique ID associated with machine 115C to determine whether the machine 115C may access and use another machine 115C or resource 115D, in accordance with a policy associated with the another machine 115C or resource 115D. Each of the machine(s) 115C may also be associated with a policy (either a one-to-one mapping or one-to-many mapping if certain types of machines all have the same role). The IAM system 115A may use the policy corresponding to the machine 115C to determine which users, roles, or other machines 115C (based on unique IDs associated therewith) may access and use the machine 115C.

The resource(s) 115D may include one or a plurality of resources, such as resource 115D-1, resource 115D-2, . . . and resource 115D-n. The resource(s) 115D may be databases, data stores, data lakes, data structures, etc. Generally, the resource(s) 115D may be data storage on the cloud 115 to obtain/receive, store, update, and provide particular data in accordance with a framework for a particular resource. Some or all of the resource(s) 115D may be associated with a unique ID. The IAM system 115A may use the unique ID associated with resource 115D to determine whether the resource 115D may access and use another machine 115C or resource 115D, in accordance with a policy associated with the another machine 115C or resource 115D. Each of the resource(s) 115D may also be associated with a policy (either a one-to-one mapping or one-to-many mapping if certain types of resources all have the same role). The IAM system 115A may use the policy corresponding to the resource 115D to determine which users, roles, or machines 115C may access and use the resource 115D.

Turning to FIG. 2, FIG. 2 depicts an exemplary policy 200 to be managed, according to one or more embodiments. Generally, the policy 200 may include a data structure 205 in a defined format to determine which users, roles, or machines may access and use particular machines or resources. The data structure 205 may be a list, e.g., of key-value pairs.

In the policy 200, the first level of the list of data structure 205 may include a version key-value pair 210, and a statement key-value pair 215. The value of the statement key-value pair 215 may include a second list, including one or a plurality of statement lists, such as statement lists 220 depicted in FIG. 2. In each statement list 220, the statement list may have a statement ID (SID) key-value pair 225, an effect key-value pair 230, an action key-value pair 235, and/or a resource key-value pair 240. The value of the SID key-value pair 225 may include a name (unique in the policy of in the cloud 115) for the statement. The value of the effect key-value pair 230 may indicate a permission setting, such as allow or deny. The value of the action key-value pair 235 may be an action list indicating particular actions that are applicable to the permission setting, such as read, write, modify, delete, etc. The value of the resource key-value pair 240 may be an ID list indicating particular users, roles, and/or machines that are applicable to the statement (e.g., who or what is affected by the permission setting). Generally, the one or a plurality of statement lists may differentiate access and permission for the users, roles, and/or machines.

Returning to FIG. 1, in one aspect of the disclosure, the policies of the user policies 115A-1, role policies 115A-2, machine policies 115A-3, and/or resource policies 115A-4 may be managed by one or more of an administrative user via a user device 105 of the administrative user, a security user via a user device 105 of the security user, or a security application of the cloud 115. For instance, the user device 105 may receive user inputs that indicate and/or determine that an ID of a set of policies should be added, deleted, or modified. In another embodiment, the user device 105 may receive a user input that indicates and/or determines that a report of an ID for a set of policies should be generated. Based on these user inputs and/or determinations, the user device 105 may generate/obtain a request including a target ID, an action (such as delete, add, modify, report), (optionally for add or modify actions) a new ID, and (optionally) a set of policies. Additionally, the security application may determine a compromise of a ID has occurred (e.g., based on monitoring requests to the cloud 115 from devices, data leaks, etc.), thereby automatically determining that the ID should be deleted or modified; and generate a request with a target ID corresponding to the compromised ID and a delete action or modify action to a secure/different ID.

Generally, the target ID of the request may indicate an ID that is to be managed (e.g., delete or modify actions), used as a proxy for an additional ID to be added (e.g., add action), or for a report to be generated. The new ID may indicate an ID to be added in the same place as the target ID or an ID to replace the target ID. The action may indicate what is to be done to/with the policies by modifying each policy that includes the target ID. The set of policies (if not indicated by user input or system determination) may default to all policies of the user policies 115A-1, role policies 115A-2, machine policies 115A-3, and/or resource policies 115A-4; to policies of machine policies 115A-3, and/or resource policies 115A-4; or to policies of one selected from a group consisting of user policies 115A-1, role policies 115A-2, machine policies 115A-3, and/or resource policies 115A-4. The user device 105 may use a search function, an action function, and a confirmation function to execute the request.

The search function may, for each policy indicated by the set of policies, recursively traverse a data structure of the policy to return matching keypath(s). For instance, for each key-value pair in a list, the search function may determine whether the value of the key-value pair is a list or string (recursive point); if the value is a string, the search function may determine whether the string matches the target ID; if the string is not a match, the search function may continue to traverse the data structure; and if the string is a match, the search function may store a corresponding SID (see SID key-value pair 225) and/or a keypath for the matching string and continue to traverse the data structure. A keypath may be a string representing a location of matching string. Returning to the search function, if the value of the key-value pair is a list, the search function may traverse the list and, for each element of the list, determine whether the element is a string or a list (thus going to the recursive point above). The search function may end when the traversal of the data structure is ended (e.g., each branch has been recursively searched for the target ID). The search function may then recursively traverse a data structure of a next policy until each policy of the set of policies has been searched. Note, alternatively, each policy could be searched in parallel, etc. as one of skill in the art would recognize that each data structure may be stored and accessed separately (e.g., as distinct text/XML files). After each policy is searched, the search function may output a first data set. The first data set may include information indicating policies, keypaths, and (optionally) SIDs that include strings that match the target ID, or a null value (if no strings match the target ID). The search function may store the first data set as an initial first data set, until an indication that current changes are complete.

The action function may perform an action request, for each returned SID/keypath of a policy, for each policy, indicated by the first data set, in accordance with the request. For instance, the action function may determine whether the request includes a delete action request, an add action request, a modify action request, or a report action request; if the request includes the delete action request, the action function may perform a delete action; if the request includes the add action request, the action function may perform an add action; if the request includes the modify action request, the action function may perform a modify action; and if the request includes the report action request, the action function may perform a report action.

A delete action may, for each keypath of a SID of a policy indicated by the first data set, delete the target ID from the list indicated by the keypath. An add action may, for each keypath of a SID of a policy indicated by the first data set, add a new ID to the list indicated by the keypath, so that the new ID appears in the same location as the target ID. A modify action may, for each keypath of a SID of a policy indicated by the first data set, modify the target ID from the request into the new ID in the list indicated by the keypath, so that the target ID is replaced by the new ID. A report action may execute the search function for the target ID and output a report based om a first set of data, or obtain the initial first data set, if the search function has already executed and the initial first data set was stored.

The confirm function may confirm that the requested action has been successfully implemented (e.g., in case or error or crash of the application). The confirm function may determine whether the request includes a delete action, an add action, or a modify action. If the request includes the delete action, the confirm function may execute the search function for the target ID with a report action request, and confirm the new first data set is a null value. If the request includes the add action, the confirm function may execute a search function for the new ID and confirm the new first data set matches the initial first data set. If the request includes the modify action, the confirm function may perform one or both of: (1) execute the search function for the target ID and confirm the new first data set is a null value, and (2) execute the search function for the new ID and confirm new first data set matches the initial first data set.

Therefore, the user device 105/security application of the present disclosure may search for and return all instances of a target ID in a set of policies, managed by the IAM system 115A. The user device 105/security application of the present disclosure may then automatically perform an action for the target ID, thereby saving user time and effort, increasing accuracy (versus a user), and/or increasing security. Moreover, the user device 105/security application of the present disclosure may execute the confirmation function to ensure that a change (delete, add, modify) was successfully completed for the set of policies, thereby increasing accuracy and/or security, e.g., in case of error or system crash before the process was completed.

Figure 3:
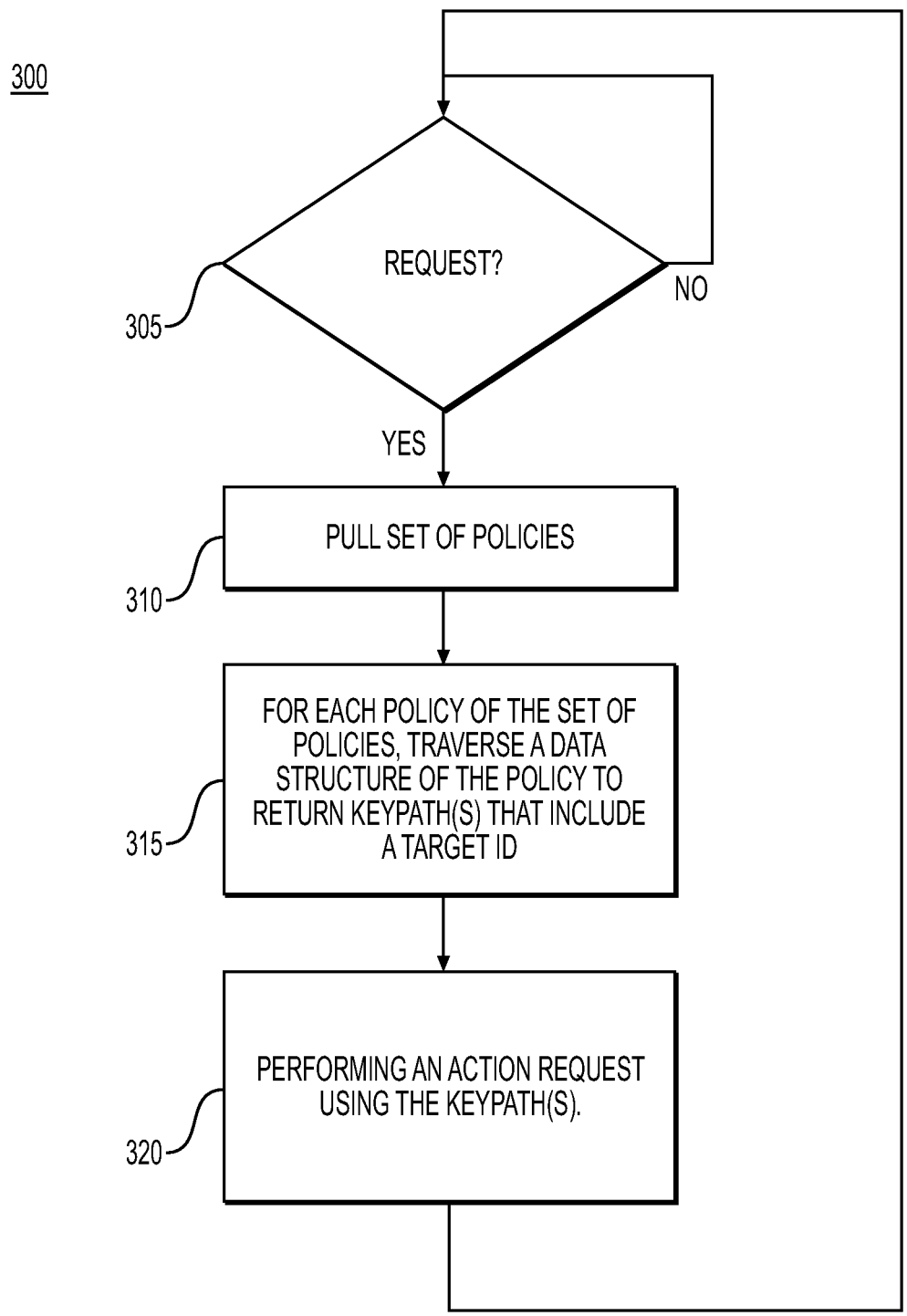
FIG. 3 depicts a flowchart for managing IDs in IAM/resource policies to update IDs, according to one or more embodiments.

FIG. 3 depicts a flowchart 300 for managing IDs in IAM/resource policies to update IDs, according to one or more embodiments. The flowchart 300 may be executed by the application of the user device 105, or the security application of the cloud 115. The flowchart 300 may start by determining whether a request regarding a target ID in a set of IAM/resource policies is obtained (Block 305). For instance, the user device 105 may receive user inputs indicating a target ID and an action (e.g., delete, add, modify, report), as discussed above, for a set of policies. Additionally, the security application may determine a compromise of an ID has occurred; automatically determine that the ID should be deleted or modified; and generate a request, as discussed above. In response to determining the request has not been obtained (Block 305: No), the flowchart 300 may proceed to return to determine whether a request is obtained (Block 305). In response to determining that the request has been obtained (Block 305: Yes), the flowchart 300 may proceed to pull the set of policies from the cloud 115 (Block 310). For instance, the user device 105 may transmit a pull message to the IAM system 115A (authorized by a unique ID associated with the user to perform the action), and the IAM system 115A may transmit the pulled data (e.g., the set of policies) to the user device 105. In the case that the security application is executing the flowchart 300, the security application may transmit the pull message to the IAM system 115A (again, authorized by a unique ID associated with the machine associated with the security application), and the IAM system 115A may transmit the pulled data (e.g., the set of policies) to the security application.

The flowchart 300 may proceed to, for each policy of the set of policies, traverse the data structure of the policy to return keypath(s) that include the target ID (Block 315). For instance, the user device 105/security application may execute the search function for the target ID to obtain the first data set, as discussed above.

The flowchart 300 may proceed to perform an action request using the keypath(s) (Block 320). For instance, the user device 105/security application may execute the action function, as discussed above. The flowchart 300 may proceed to return to determine whether a request is obtained (Block 305).

Figure 4:
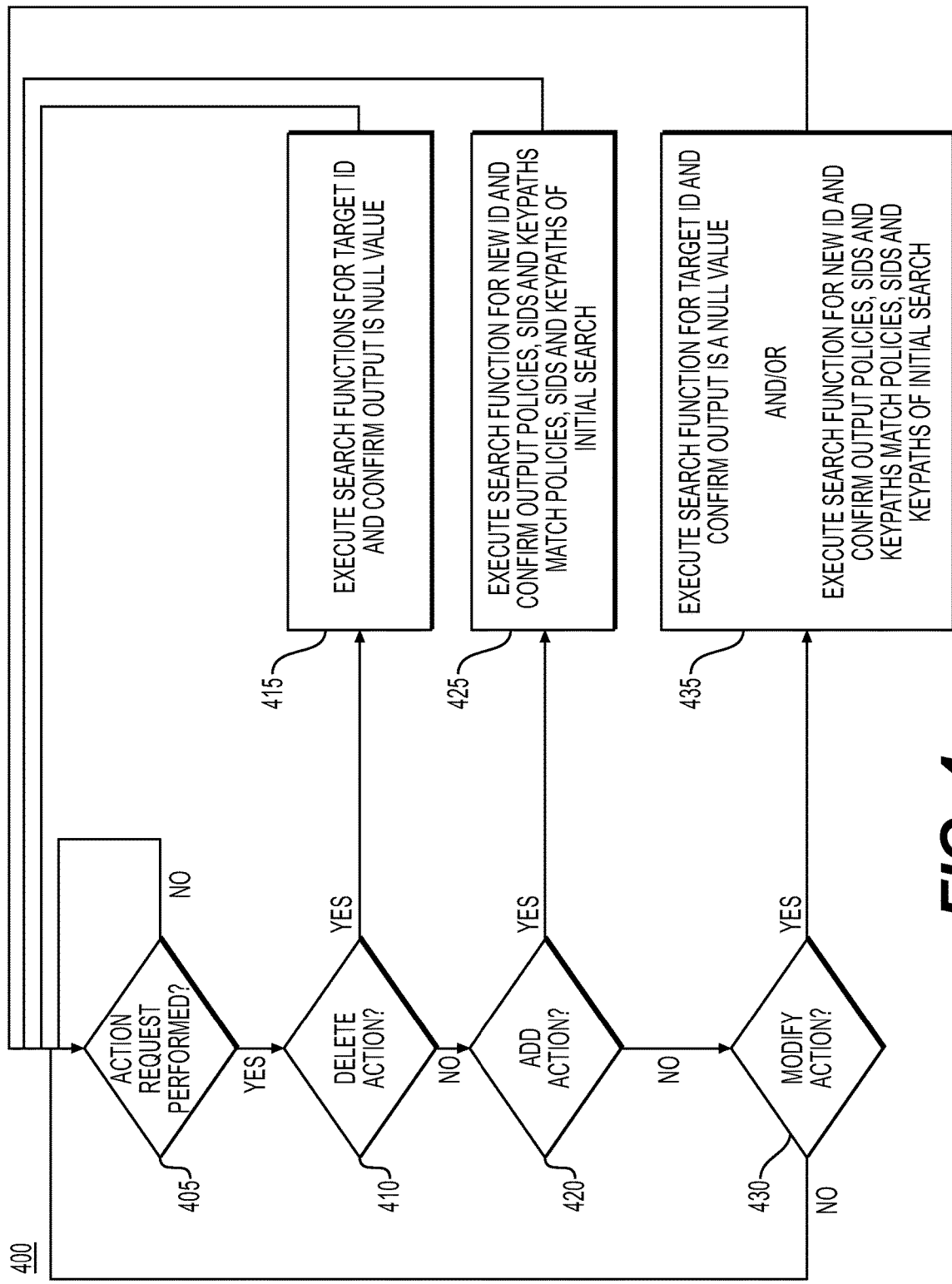
FIG. 4 depicts a flowchart for managing IDs in IAM/resource policies to confirm updates to IDs, according to one or more embodiments.

FIG. 4 depicts a flowchart 400 for managing IDs in IAM/resource policies to confirm updates to IDs, according to one or more embodiments. The flowchart 400 may be executed by the application of the user device 105, or the security application of the cloud 115 to confirm that a requested action has been successfully implemented. The flowchart 400 may start by determining whether an action request has been performed (Block 405). For instance, the user device 105/security application may automatically detect when the action function has been executed. In response to determining that an action request has not been performed (Block 405: No), the flowchart 400 may proceed to return to determine whether an action request has been performed (Block 405).

In response to determining that an action request has been performed (Block 405: Yes), the flowchart 400 may proceed to determine whether a delete action was performed (Block 410). In response to determining that a delete action was performed (Block 410: Yes), the flowchart 400 may proceed to execute the search function for a target ID and confirm an output is null value (Block 415). For instance, the user device 105/security application may execute the search function for the target ID in the request and confirm that the new first data set returned by the search function is a null value, thereby confirming the delete action correctly deleted the target ID at the keypaths. The flowchart may then proceed to return to determine whether an action request has been performed (Block 405).

In response to determining that a delete action was not performed (Block 410: No), the flowchart 400 may proceed to determine whether an add action was performed (Block 420). In response to determining that an add action was performed (Block 420: Yes), the flowchart 400 may proceed to execute the search function for a new ID and confirm output policies, SIDs and keypaths for the new ID match policies, SIDs and keypaths of an initial search (Block 425), e.g., for the target ID from the add action request. For instance, the user device 105/security application may execute the search function for the new ID in the request and confirm the new first data set matches the initial first data set, thereby confirming the add action correctly changed the keypaths. The flowchart may then proceed to return to determine whether an action request has been performed (Block 405).

In response to determining that an add action was not performed (Block 420: No), the flowchart 400 may proceed to determine whether a modify action was performed (Block 430). In response to determining that a modify action was performed (Block 430: Yes), the flowchart 400 may proceed to (1) execute the search function for the target ID and confirm an output is a null value, and/or (2) execute the search function for a new ID and confirm output policies, SIDs and keypaths match policies, SIDs and keypaths of initial search (Block 435). For instance, the user device 105/security application may (1) execute the search function for the target ID indicated in the request and confirm the new first data set is a null value, and/or (2) execute the search function for the new ID indicated in the request and confirm the new first data set matches the initial first data set, thereby confirming the modify action correctly changed the keypaths. The flowchart may then proceed to return to determine whether an action request has been performed (Block 405). In response to determining that a modify action was not performed (Block 430: No), the flowchart 400 may proceed to return to determine whether an action request has been performed (Block 405), as the action request may not have been performed (e.g., an error) or may have been a report action request.

Figure 5:
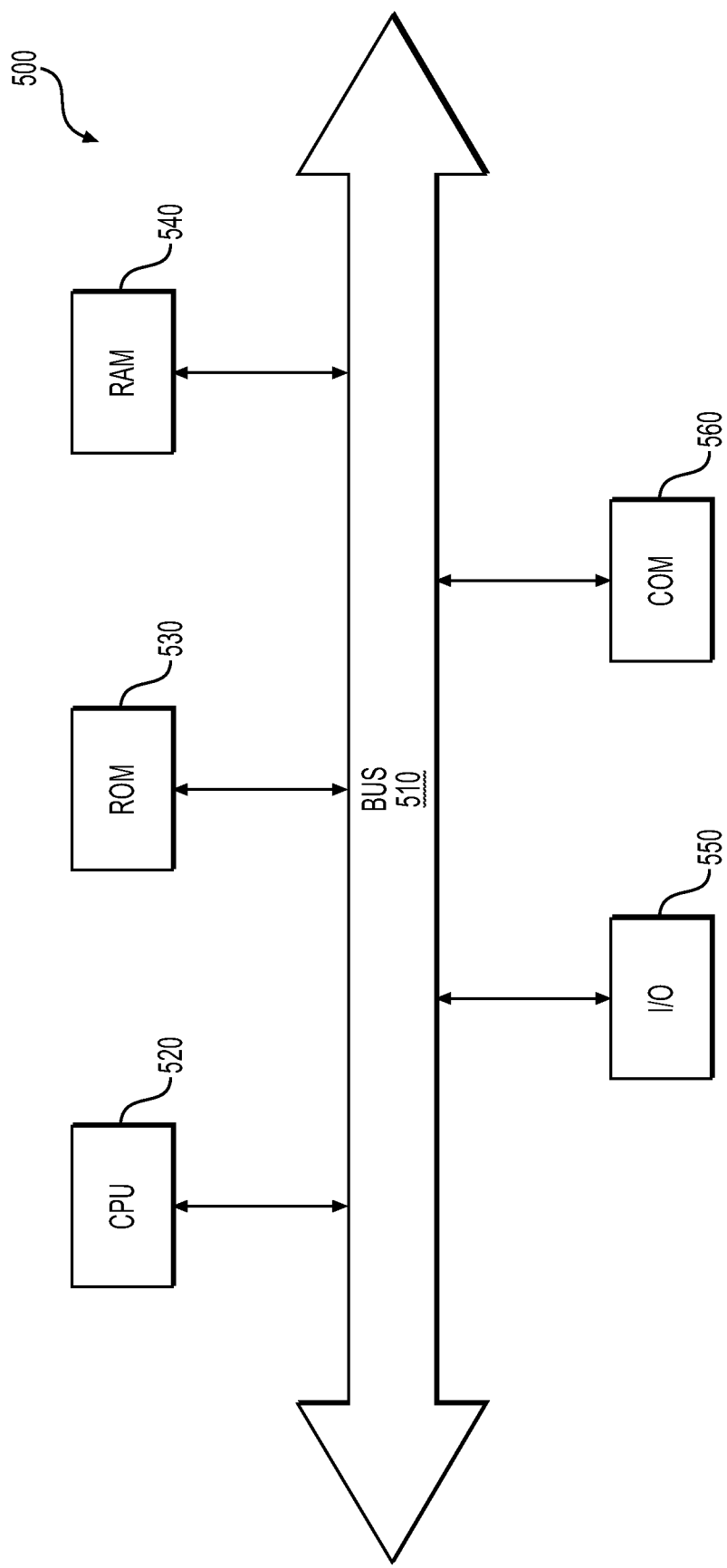
FIG. 5 depicts an example system that may execute techniques presented herein.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for managing IDs in identity access management (IAM)/resource policies, the computer-implemented method comprising:
   obtaining a request regarding a target identification in a set of IAM/resource policies, the request including an action request;
   pulling the set of IAM/resource policies from a service;
   for each policy of the pulled set of IAM/resource policies, recursively traversing a data structure of the policy to return keypath(s) that include the target identification; and
   modifying each policy that includes the target identification by performing the action request using the keypath(s).

2. The computer-implemented method of claim 1, wherein the action request is selected from a group comprising:
   a delete action,
   an add action,
   a modify action, and
   a report action.

3. The computer-implemented method of claim 2, wherein, when the action request is the delete action, performing the action request for a keypath includes:
   deleting the target identification from a list indicated by the keypath.

4. The computer-implemented method of claim 2, wherein, when the action request is the add action, performing the action request for a keypath includes:
   adding a new identification to a list indicated by the keypath, the new identification being indicated by the request.

5. The computer-implemented method of claim 2, wherein, when the action request is the modify action, performing the action request for a keypath includes:
   modifying the target identification to a new identification in a list indicated by the keypath, the new identification being indicated by the request.

6. The computer-implemented method of claim 1, wherein the data structure is a first list including a plurality of key-value pairs, and
   recursively traversing the data structure of the policy to return the keypath(s) that include the target identification includes, for each key-value pair of the plurality of key-value pairs:
   determining whether a value of the key-value pair is a second list or a string;
   in response to determining the value is the string, determining whether the string matches the target identification; and
   in response to determining the value is the second list, traversing the second list to determine whether any second list value of the second list includes a second string that matches the target identification.

7. The computer-implemented method of claim 6, further comprising:
   in response to determining a particular string does not match the target identification, continuing to traverse the data structure.

8. The computer-implemented method of claim 6, further comprising:
   in response to determining a particular string matches the target identification, determining a keypath corresponding to the particular string that matches the target identification; and
   storing the keypath and continuing to traverse the data structure.

9. The computer-implemented method of claim 8, further comprising, after traversing the data structure, generating a first data set, the first data set including information indicating policies and keypaths that include strings that match the target identification.

10. The computer-implemented method of claim 9, wherein performing the action request using the keypath(s) includes, for each particular keypath of the keypath(s) in a respective policy of the policies:
    performing the action request on a particular data structure corresponding to the particular keypath.

11. A system for managing IDs in identity access management (IAM)/resource policies, the system comprising:
    at least one memory storing instructions; and
    at least one processor executing the instructions to perform a process including:
    obtaining a request regarding a target identification in a set of IAM/resource policies, the request including an action request;
    pulling the set of IAM/resource policies from a service;
    for each policy of the pulled set of IAM/resource policies, recursively traversing a data structure of the policy to return keypath(s) that include the target identification; and
    modifying each policy that includes the target identification by performing the action request using the keypath(s).

12. The system of claim 11, wherein the data structure is a first list including a plurality of key-value pairs, and
    the process further includes, to recursively traverse the data structure of the policy to return the keypath(s) that include the target identification, for each key-value pair of the plurality of key-value pairs:
    determining whether a value of the key-value pair is a second list or a string;
    in response to determining the value is the string, determining whether the string matches the target identification; and
    in response to determining the value is the second list, traversing the second list to determine whether any second list value of the second list includes a second string that matches the target identification.

13. The system of claim 12, wherein the process further includes:
    in response to determining a particular string does not match the target identification, continuing to traverse the data structure.

14. The system of claim 12, wherein the process further includes:
    in response to determining a particular string matches the target identification, determining a keypath corresponding to the particular string that matches the target identification; and
    storing the keypath and continuing to traverse the data structure.

15. The system of claim 14, wherein the process further includes, after traversing the data structure, generating a first data set, the first data set including information indicating policies and keypaths that include strings that match the target identification.

16. The system of claim 15, wherein the process further includes, to perform the action request using the keypath(s), for each particular keypath of the keypath(s) in a respective policy of the policies:

performing the action request on a particular data structure corresponding to the particular keypath.

17. The system of claim 11, wherein, when the action request is a delete action, performing the action request for a keypath includes:

deleting the target identification from a list indicated by the keypath.

18. The system of claim 11, wherein, when the action request is an add action, performing the action request for a keypath includes:

adding a new identification to a list indicated by the keypath, the new identification being indicated by the request.

19. The system of claim 11, wherein, when the action request is a modify action, performing the action request for a keypath includes:

modifying the target identification to a new identification in a list indicated by the keypath, the new identification being indicated by the request.

20. A non-transitory computer-readable medium storing instructions that, when executed by a processor, cause the processor to perform a method for managing IDs in identity access management (IAM)/resource policies, the method comprising:

obtaining a request regarding a target identification in a set of IAM/resource policies, the request including an action request;

pulling the set of IAM/resource policies from a service;

for each policy of the pulled set of IAM/resource policies, recursively traversing a data structure of the policy to return keypath(s) that include the target identification; and modifying each policy that includes the target identification by performing the action request using the keypath(s), the action request being selected from a group comprising:

a delete action, an add action, a modify action, and a report action.

* * * * *